June 21, 1966 E. GÖTZ ET AL 3,257,656

DIGITALLY CODED SCALE IN LINEAR OR DISC FORM
FOR CONTROLLING MACHINE TOOLS

Filed Feb. 1, 1963 2 Sheets-Sheet 1

INVENTORS
Elmar Götz &
Wolfgang Pabst

BY Spencer & Kaye
ATTORNEYS

June 21, 1966 E. GÖTZ ETAL 3,257,656

DIGITALLY CODED SCALE IN LINEAR OR DISC FORM FOR CONTROLLING MACHINE TOOLS

Filed Feb. 1, 1963 2 Sheets-Sheet 2

INVENTORS
Elmar Götz &
Wolfgang Pabst

BY Spencer & Kaye

ATTORNEYS

United States Patent Office 3,257,656 Patented June 21, 1966

3,257,656

DIGITALLY CODED SCALE IN LINEAR OR DISC FORM FOR CONTROLLING MACHINE TOOLS

Elmar Götz, Frankfurt-Gravenbruch, and Wolfgang Pabst, Neu-Isenburg, Germany, assignors to Licentia Patent-Verwaltungs-G.m.b.H., Frankfurt am Main, Germany Filed Feb. 1, 1963, Ser. No. 255,485
Claims priority, application Germany, Feb. 2, 1962, L 41,123
15 Claims. (Cl. 340—347)

The present invention relates to a digitally coded scale in linear or disc form for controlling machine tools.

There exist systems using digitally coded multiple-track scales in disc form in which a read-out device, hereinafter referred to as a signal generator, is assigned to each track. These signal generators are arranged along one line which is radial with respect to the disc, which signal generators scan all of the tracks simultaneously. Generally, the raster divisions of the scale are in the natural binary form, and signal generators put out signals in digital form. For example, the scale may be divided into white and black indicia, and the scanning devices will put out a binary 1 (=L) if they scan a white division and a binary 0 if they scan a black division.

There exist other systems using digitally coded multiple-track scales in rectilinear or disc form in which one of the tracks is scanned by a single signal generator while the other tracks are scanned by two signal generators. In that case, the position of the read-out line obtained by the signal generators is determined by the first-mentioned single signal generator and the pairs of signal generators pertaining to the other tracks are arranged, respectively, ahead of and behind, i.e., they lead or trail, this read-out line.

FIGURE 1 is a section of such a natural binary coded scale. This scale has, for example, six tracks having the orders $2^0$, $2^1$, $2^2$, $2^3$, $2^4$, $2^5$, respectively, with the raster division increasing, from one track to the next, by a factor of 2. The scale cooperates with signal generators which are arranged over the scale as shown symbolically by the small circles. These signal generators can, for instance, be constituted by photosensitive scanning devices. As is shown in FIGURE 1, the lowest order track $2^0$ is scanned by a single signal generator which determines the position of the intended read-out line indicated at A. The optimum position of the other signal generators, there being one pair of such signal generators for each of these other tracks, is ¼ of the division of the respective track away from the read-out line A.

The system will have inaccuracies resulting from faults in the manufacture of the coded scales and from the quality of the scanning. The inaccuracy of the position of the signal generators for the tracks $2^1$ to $2^5$ and the displacement of the divisions of these tracks can increase by a factor of 2. Consequently, the larger the scale divisions, the less accurate or critical will be the scanning.

The signal generators to be scanned are selected by means of interrogating devices which can be constituted as logic circuits. These can, for example, be so-called gate circuits whose opening and closing for any particular track is controlled by the next-lower track.

The signal generators may, for instance, scan as follows: if in any one track there is a read-out signal O, the leading signal generator of the next higher track is read out, while if in any one track there is a read-out signal L, it is the trailing or lagging signal generator of this next higher-order track that is read out. The selection of which signal generator is to be interrogated is controlled by the $2^0$, i.e., the $0^{th}$, track.

This type of signal generator arrangement is sometimes designated as V-type or Kliever-type scanning.

FIGURE 2 shows the manner in which the tracks of the coded scale of FIGURE 1 are controlled. Track 0 controls track 1; track 1 controls track 2; track 2 controls track 3; and so on.

Coded scales of the above-mentioned type are used for controlling various types of machinery. For example, such scales can be used in machine tools for controlling the adjusting device thereof so as to fix the setting thereof, whereby the positioning of the work tool and the work piece relative to each other can be set in the manner dictated by the programming of the machine. In practice, coded scales for this purpose will have a width of up to 20 tracks=20 bits.

Numerical control arrangements of the above type are called upon to operate at high speeds, i.e., the work tool should be made to traverse its prescribed path relative to the work piece at the highest possible speed. With the arrangement shown in FIGURE 2, it takes considerable time to process a signal having a width of 20 bits, so that the speed at which the machine tool operates is kept relatively low.

It is, therefore, an object of the present invention to provide an arrangement which overcomes this drawback, namely, to provide a coded scale and signal generator system by means of which a machine tool can be controlled substantially more rapidly than was heretofore possible, i.e., an arrangement by means of which the work tool of a machine tool can be made to follow its prescribed path more rapidly than with presently existing arrangements.

It is another object of the present invention to provide an arrangement in which the natural binary division of the scale, as shown in FIGURE 1, is dispensed with, because the use of binary coded scales in control systems often require a binary-to-decimal converter for purposes of converting the binary numbers into decimal numbers.

With the above objects in view, the present invention resides in a coded scale in rectilinear or disc form, particularly for controlling machine tools, one of whose tracks is scanned by a single signal generator and each of whose other tracks are scanned by two signal generators, wherein the position of the read-out line is determined by the first-mentioned single signal geenrator and the pairs of signal generators for scanning the other tracks are arranged, respectively, ahead of and behind the single signal generator, there being a control arrangement for controlling the interrogation of the signal generator. According to the present invention, at least some of the signal generators are actuated simultaneously. According to another feature of the invention, the tracks originating from the $0^{th}$ track are combined into groups and one track of each group controls at least two tracks of its group simultaneously. According to yet another feature of the present invention, the raster division of the scale represents decimal numbers which are coded in natural binary form. According to still another feature of the invention, the arrangement comprises an interrogating control arrangement which derives two signals (L and O) from given so-called reference tracks (e.g., $0^{th}$ track), which signals are applied to logic circuits which, in turn, control the signal generators of higher-order tracks. According to a still further feature of the present invention, the output of the signal generator pertaining to the reference tracks is connected to a flip-flop circuit, and the outputs of the signal generators of all other tracks are connected, respectively, to two AND-circuits which control a respective OR/OR NOT-circuit.

Additional objects and advantages of the present invention will become apparent upon consideration of the following description when taken in conjunction with the accompanying drawings in which:

FIGURES 1 and 2, already referred to above, show a scale according to the prior art, and the manner in which such scale operates.

Figure 3:
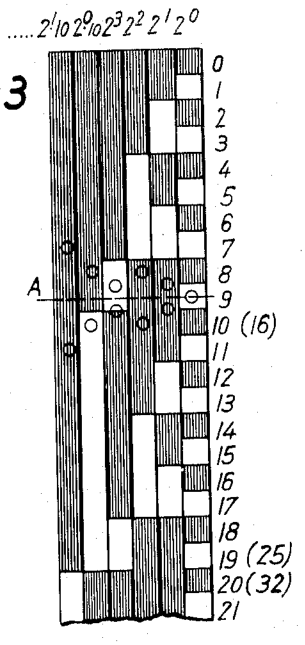
PRIOR ART Fig. 3
FIGURE 3 shows a portion of a scale arrangement according to the present invention.

Referring now to the drawings and FIGURE 3 thereof in particular, the same shows a scale whose indicia are arranged to represent natural binary coded decimal numbers. As is indicated in FIGURE 3, the first four tracks (going from right to left) have the order $2^0$ (track 0), $2^1$ (track 1), $2^2$ (track 2), $2^3$ (track 3), respectively, while the next tracks—of which only the next two are illustrated—have the order $2^0 \times 10$ (track 4), $2^1 \times 10$ (track 5), $2^3 \times 10$ (track 6), and so on. Shown at the right of the scale are the decimal numbers which pertain to the respective divisions. Track $2^0$ is scanned by a single signal generator, indicated symbolically by a circle. Each of the other tracks is scanned by two signal generators. The read-out line is indicated at A.

Figure 4:
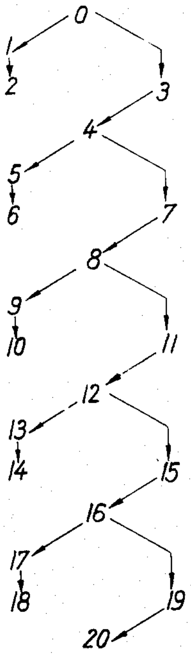
PRIOR ART Fig. 4
FIGURE 4 shows the manner in which the tracks of the scale according to the FIGURE 3 are controlled.

According to the present invention, the signal generators are interconnected in such a manner that at least some of the tracks are scanned simultaneously, sometimes referred to as "parallel timed relationship," as illustrated in FIGURE 4 which shows the following:

Track 0 controls the next track 1 as well as track 3.
 Track 1 controls track 2.
 Track 3 controls track 4.
Track 4 controls tracks 5 and 7.
 Track 5 controls track 6.
 Track 7 controls track 8.
Track 8 controls tracks 9 and 11.
 Track 9 controls track 10.
 Track 11 controls track 12.
Track 12 controls tracks 13 and 15.
 Track 13 controls track 14.
 Track 15 controls track 16.
Track 16 controls tracks 17 and 19.
 Track 17 controls track 18.
 Track 19 controls track 20.

Figure 2:
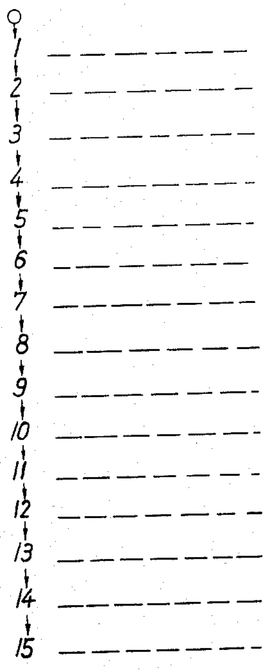

The example involving 20 bits has been selected intentionally, and FIGURE 4, which represents the control schematically, has intentionally been drawn in alignment with the control of FIGURE 2, the latter being representative of the prior art involving a scale of at least 15 bits. As a comparison between FIGURES 2 and 4 shows, the time interval required for interrogating 20 tracks by following the present invention is the same time interval which is required to interrogate but 15 tracks by following the heretofore conventional method.

It will be appreciated that by shortening the time required for interrogation, and hence increasing the scanning speed of the scale, the rate at which a machine tool can follow the programmed course is likewise increased.

Figure 1:
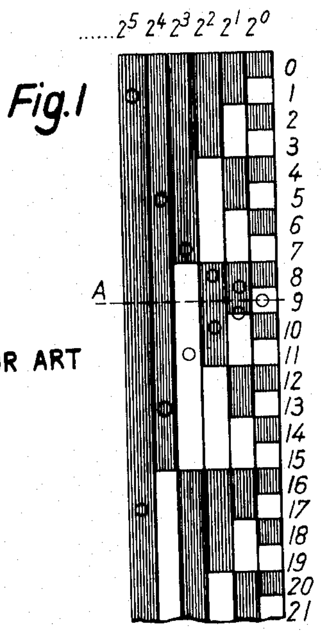

The signal generators are arranged as shown in FIGURE 3. As was the case in FIGURE 1, there is again a single signal generator associated with the track $2^0$. The two signal generators pertaining to track $2^1$ are again arranged as in FIGURE 1, and the same holds true for the two signal generators pertaining to track $2^2$. However, the signal generators pertaining to track $2^3$ are spaced from each other the same distance which the signal generators of track $2^1$ are spaced from each other. The signal generators of the next track ($2^0 \times 10$) are spaced apart a distance equal to that which the signal generators of track $2^2$ are spaced apart.

FIGURE 3 also shows that, according to the present invention, the divisions are arranged to represent decimal numbers encoded in natural binary form. Both this scale, as well as the scale of FIGURE 1 which is in natural binary form, can be scanned by means of the control arrangement according to the present invention. However, the arrangement of signal generators shown in FIGURE 1 could not be used with the scale of FIGURE 3 because, in the latter, the raster division does not increase, from track to track, by the factor 2. As is apparent, there are points of discontinuity appearing between the number 9 and 10, the numbers 19 and 20, and so on. The decimal number 9 in FIGURE 3 still corresponds to the binary number L00L, but the next decimal number 10 no longer corresponds to the binary number L0L0, but to L0000 (16), with the encoded number to be read here in such a manner that the value L of the highest-order digit represents the first decade and the following values O of the lower-order tracks represent the value of the 0$^{th}$ decade. Thus, the tracks $2^0$ to $2^3$ of the scale of FIGURE 3 contain in each decade the binary numbers 0000 (decimal number 0) to L00L (decimal number 9). The following tracks each represent, over one decade, the valves L0000 (decimal 10), L00000 (decimal 20), and so on.

FIGURE 5 again shows a section of a scale according to FIGURE 3 with signal generators occupying the illustrated positions. The positions of the signal generators correspond to the decimal number 12 encoded in natural binary form. The signal generators arranged above the read-out line A (as viewed in FIGURE 5) are the lagging signal generators referenced *n*, while the signal generators arranged below the line A (again as viewed in FIGURE 5) are the leading signal generators, reference *v*. The signal generators being interrogated are marked with a cross, it being assumed that when the reference signal generator associated with track $2^0$ measures the value O (represented here by a black scale division), it is the leading signal generator for the next track $2^1$ which is interrogated. This signal generator scans a white scale division so that, accordingly, the lagging signal generator of the next track $2^2$ is interrogated. The latter scans a black scale division and thus reads out the value O. The fact that the track $2^0$ measures the value O, as stated above, means that the next track $2^3$ will also have its leading signal generator interrogated. The latter, being in the process of scanning a black division, puts out the signal O so that the next track $2^0 \times 10$ has its leading signal generator interrogated.

Figure 5:
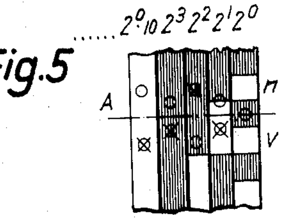
FIGURE 5 is a section of the scale portion of FIGURE 3.
Figure 6:
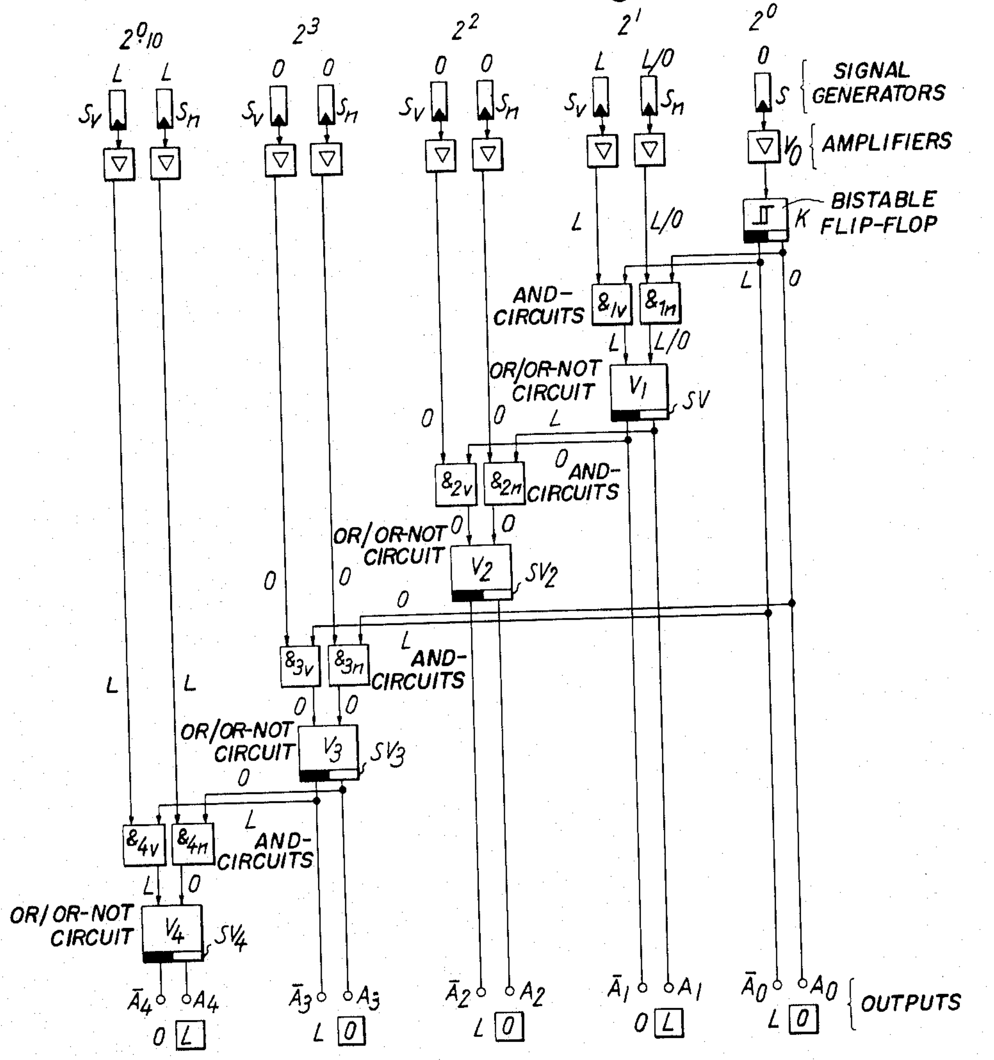
FIGURE 6 is a schematic circuit diagram of a logic circuit according to the present invention.

FIGURE 6 is a diagram of a logic circuit by means of which the above-described operation may be carried out. In FIGURE 6, the signal generators of FIGURE 5 are constituted by photo-sensitive elements S, there being one such photoelement pertaining to track $2^0$ and two such photoelements for every other track, as indicated. Also, the reference characters S are provided with subscripts *v* and *n* to indicate that the various photoelements constitute leading and lagging signal generators, respectively, except, of course, for the photoelement pertaining to the track $2^0$.

Each photoelement has its output connected to an amplifier, the amplifier associated with photoelement S of track $2^0$ being referenced $V_0$. The output of amplifier $V_0$ is connected to the input of a bistable flip-flop circuit K with which has two outputs $A_0$ and $\overline{A}_0$—being affirmed and negated outputs, respectively, as indicated by the overscore on the latter—at which appear the values O or L. The affirmed output is indicated by the white area and the negated output by the black.

The outputs of the amplifiers connected to the signal generators $S_v$, $S_n$, of the next track $2^1$ are applied to one input of each of two AND-circuits $\&_{1v}$, $\&_{1n}$, respectively, the other inputs of these two AND-circuits being connected to the outputs $A_0$, $\overline{A}_0$, respectively, of the flip-flop circuit K. The outputs of the AND-circuits are applied to the inputs of an OR-circuit $v_1$ to whose output is connected a switching amplifier SV which may, for example, be a D.C. coupled amplifier consisting of two transistors. The components $v_1$ and SV together constitute an OR/OR NOT-circuit having affirmed and negated outputs $A_1$, $\overline{A}_1$, indicated by the white and black areas, respectively, at which outputs may appear the values O or L.

The outputs of the amplifiers connected to the signal generators $S_v$, $S_n$, of the track $2^2$ are applied to one input of each of two further AND-circuits $\&_{2v}$, $\&_{2n}$, respectively. the other inputs of these AND-circuits being connected to the outputs $\overline{A}_1$ and $A_1$ of the OR/OR NOT-circuit incorporating the switching amplifier SV. The outputs of the last-mentioned AND-circuits are applied to the inputs of another OR-circuit $v_2$, to whose output is connected another switching amplifier $SV_2$ so as to form another OR/OR NOT-circuit having two outputs $A_2$, $\overline{A}_2$.

The outputs of the amplifiers connected to the signal generators $S_v$, $S_n$, of the next track $2^3$ are applied to one input of each of two still further AND-circuits $\&_{3v}$, $\&_{3n}$, respectively, the other inputs of these two AND-circuits being connected to the outputs $\overline{A}_0$ and $A_0$, respectively, of the flip-flop circuit K pertaining to the lowest-order track $2^0$. This, it will be noted, is consistent with FIGURE 4 which shows that track 0 ($2^0$), in addition to controlling track 1 ($2^1$) also controls track 3 ($2^3$). The outputs of AND-circuits $\&_{3v}$, $\&_{3n}$, are connected to the inputs of yet another OR-circuit $v_3$, to whose output is connected another switching amplifier $SV_3$ yielding a third OR/OR NOT-circuit having two outputs $A_3$, $\overline{A}_3$.

The amplifiers connected to the photoelements constituting the signal generators $S_v$, $S_n$, of track $2^0 \times 10$ (track 4) are applied to one input of each of two further AND-circuits $\&_{4v}$, $\&_{4n}$, respectively, the other inputs of these AND-circuits being connected to the outputs $\overline{A}_3$, $A_3$, of the OR/OR NOT-circuit incorporating the amplifier $SV_3$ pertaining to track 3. The outputs of the two last-mentioned AND-circuits are connected to the inputs of a further OR-circuit $v_4$ which, as the others, has a switching amplifier $SV_4$ to form a fourth OR/OR NOT-circuit having two outputs $A_4$, $\overline{A}_4$.

Also shown in FIGURE 6 are the values which are scanned by the various photoelements constituting the signal generators. The photoelement S pertaining to track 2°, being in alignment with a black scale division, puts out the value O; the photoelement $S_n$ of track $2^1$, which straddles black and white scale divisions, will have an indeterminate output, i.e., either O or L; the photoelement $S_v$ of track $2^1$, being in alignment with a white scale division, has an output L; each of the four photoelements pertaining to tracks $2^2$ and $2^3$ has the output O; and each of the two photoelements pertaining to track $2^0 \times 10$ has the output L.

FIGURE 6 also shows the values appearing at the various circuit elements, namely at the outputs A, $\overline{A}$ of the flip-flop and the OR/OR NOT-circuit, at the outputs of the amplifiers connected to the photoelements, and at the outputs of the AND-circuits. Thus, there appears at the affirmed outputs $A_0$, $A_1$, $A_2$, $A_3$, $A_4$, the binary coded decimal number 12=L00L0, with the outputs $A_0$ through $A_3$ having the orders $2^0$ to $2^3$, respectively, and the output $A_4$ the order $2^0 \times 10$. The corresponding negated values appear at the outputs $\overline{A}_0$ to $\overline{A}_4$. In practice, these negated outputs are not required for reading out the command signal, since the means for reading out the command signal may be connected simply to the affirmed outputs of the flip-flop K and the various OR/OR NOT-circuits. These read-out means are shown symbolically by the squares which frame the values appearing at the affirmed outputs.

The circuitry for scanning higher-order tracks will be similarly arranged so as to obtain the effect described above and illustrated in FIGURE 4, i.e., the output of the fourth OR/OR NOT-circuit will be connected to the components of tracks 5 and 7, and so on. Thus, the components pertaining to tracks 0, 1, 2, and 3 may be deemed to constitute a first component group, there being a series of similar groups, plus the components relating to track 20 for scanning a scale having a width of 20 bits. The components pertaining to track 4 are thus already part of the second group. Within each group, the signal generator or generators pertaining to a given track (there being but one signal generator for the given track 0 of the first group encompassing tracks 0, 1, 2, 3, while there are two signal generators for what may be the given track within any of the other groups) activates or activate, simultaneously, the signal generators pertaining to at least two other tracks of the same group. That is to say, in the first group the signal generator pertaining to track 0 activates, simultaneously, the signal generators pertaining to tracks 1 and 3; in the second group encompassing tracks 4, 5, 6, 7, the signal generators pertaining to track 4 activate, simultaneously, the signal generators pertaining to tracks 5 and 7, and so on.

It will be understood that the above description of the present invention is susceptible to various modifications, changes, and adaptations, and the same are intended to be comprehended within the meaning and range of equivalents of the appended claims.

What is claimed is:

1. In a control arrangement, the combination which comprises:

(a) a digitally coded binary scale having a series of successively higher order tracks;

(b) a plurality of signal generators for scanning said tracks each of which signal generators puts out O or L, there being but a single signal generator for scanning the track of the lowest order and a respective pair of signal generators for scanning each of the other tracks, said single signal generator being determinative of the read-out line of said scale and one of the two signal generators of each pair of signal generators being arranged ahead of said read-out line and the other of the two signal generators of each pair of signal generators being arranged behind said read-out line; and (c) a circuit means for controlling the interrogation of said signal generators such that when the signal generator of a given track reads out O, it activates the leading signal generator of the next higher-order track and when the signal generator of a given track reads out L, it activates the lagging signal generator of the next higher-order track, said circuit means controlling more than one of said plurality of signal generators at any one time.

2. The combination defined in claim 1 wherein, beginning with said lowest-order track, the tracks are combined into groups of tracks, and wherein the signal generator or generators pertaining to a given one track of any one group activates or activate, simultaneously, the signal generators pertaining to at least two other tracks of the same group.

3. The combination defined in claim 1 wherein said scale is divided into divisions arranged to represent decimal numbers in natural binary code.

4. The combination defined in claim 1 wherein said circuit means comprise logic circuit means for deriving two signals from the signal generator or generators pertaining to at least one of said tracks and for applying signals to the signal generators pertaining to tracks which are of a higher order than said one track.

5. The combination defined in claim 1 wherein said circuit means comprise logic circuit means for deriving two signals from said single signal generator pertaining to said one track and for applying signals to the signal generators pertaining to tracks which are of a higher order than said one track.

6. The combination defined in claim 5 wherein said logic circuit means comprise a flip-flop circuit connected to said single signal generator pertaining to said one track, a plurality of pairs of AND-circuits, the AND-circuits of each pair being connected, respectively, to the pairs of signal generators pertaining to the other tracks, and a plurality of OR/OR NOT-circuits, each respective OR/OR NOT-circuit being connected to the outputs of the pair of AND-circuits pertaining to a respective track.

7. The combination defined in claim 1 wherein said scale is rectilinear.

8. The combination defined in claim 1 wherein said scale is disc-shaped.

9. In a control arrangement for machine tools, which arrangement comprises a digitally coded binary scale one of whose tracks is scanned by a single signal generator and each of whose other tracks is scanned by a respective pair of further signal generators, the position of the desired read-out line being determined by said single signal generator and the two signal generators pertaining to each pair of signal generators being arranged so as to lead and lag, respectively, said read-out line, and interrogating means associated with said signal generators such that when the signal generator of a track reads out O, it influences the leading signal generator of the next higher-order track and when the signal generator of a track reads out L, it influences the lagging signal generator of the next higher-order track, the improvement that at least some of said signal generators are activated simultaneously.

10. In a machine tool control arrangement using a digitally coded binary scale having a series of successively higher order tracks, the combination which comprises:

(a) a plurality of signal generators for scanning the track each of which signal generators puts out O or L, there being but a single signal generator for scanning the tracks of the lowest order and a respective pair of signal generators for scanning each of the other tracks, said single signal generator being determinative of the read-out lines of the scale, and one of the two signal generators of each pair of signal generators being arranged to lead the read-out line and the other of the two signal generators of each pair of signal generators being arranged to lag the read-out line; and (b) circuit means for controlling the interrogation of said signal generators such that when the signal generator of a given track reads out O, it activates the leading signal generator of the next higher-order track and when the signal generator of a given track reads out L, it activates the lagging signal generator of the next higher-order track, said circuit means activating more than one of said plurality of signal generators at any one time.

11. In a machine tool control arrangement using a digitally coded scale having a series of tracks beginning with track 0, the combination which comprises:

(a) a first signal generator for scanning track 0, the position of said first signal generator being determinative of the read-out line of the scale;

(b) a flip-flop circuit connected to said first signal generator, said flip-flop circuit having affirmed and negated outputs;

(c) a second signal generator for scanning track 1 of the scale and being arranged to lag the read-out line;

(d) a first AND-circuit having one input connected to the output of said second signal generator and another input connected to said affirmed output of said flip-flop circuit;

(e) a third signal generator for scanning track 1 of the scale and being arranged to lead the read-out line;

(f) a second AND-circuit having one input connected to the output of said third signal generator and another input connected to said negated output of said flip-flop circuit;

(g) a first OR/OR NOT-circuit having two inputs connected, respectively, to the two outputs of said first and second AND-circuits, said first OR/OR NOT-circuit having affirmed and negated outputs;

(h) a fourth signal generator for scanning track 2 of the scale and being arranged to lag the read-out line;

(i) a third AND-circuit having one input connected to the output of said fourth signal generator and another input connected to said affirmed output of said first OR/OR NOT-circuit;

(j) a fifth signal generator for scanning track 2 of the scale and being arranged to lead the read-out line;

(k) a fourth AND-circuit having one input connected to the output of said fifth signal generator and another input connected to said negated output of said first OR/OR NOT-circuit;

(l) a second OR/OR NOT-circuit having two inputs connected, respectively, to the two outputs of said third and fourth AND-circuits, said second OR/OR NOT-circuit having at least an affirmed output;

(m) a sixth signal generator for scanning track 3 of the scale and being arranged to lag the read-out line;

(n) a fifth AND-circuit having one input connected to the output of said sixth signal generator and another input connected to said affirmed output of said flip-flop circuit;

(o) a seventh signal generator for scanning track 3 of the scale and being arranged to lead the read-out line;

(p) a sixth AND-circuit having one input connected to the output of said seventh signal generator and another input connected to said negated output of said flip-flop circuit;

(q) a third OR/OR NOT-circuit having two inputs connected, respectively, to the two outputs of said fifth and sixth AND-circuits, respectively, said third OR/OR NOT-circuit having at least an affirmed output; and (r) means for reading out the command signal appearing at said affirmed outputs of said flip-flop circuits and said first, second and third OR/OR NOT-circuits.

12. The combination defined in claim 11 wherein said third OR/OR NOT-circuit also has a negated output and wherein the combination further comprises:

(s) an eighth signal generator for scanning track 4 and arranged to lag the read-out line;

(t) a seventh AND-circuit having one input connected to the output of said eighth signal generator and another input connected to said affirmed output of said third OR/OR NOT-circuit;

(u) a ninth signal generator for scanning track 4 and arranged to lead the read-out line;

(v) an eighth AND-circuit having one input connected to the output of said ninth signal generator and another input connected to said negated output of said third OR/OR NOT-circuit;

(w) a fourth OR/OR NOT-circuit having two inputs connected, respectively, to the two outputs of said seventh and eighth AND-circuits, respectively, said fourth OR/OR NOT-circuit having at least an affirmed output; and (x) said read-out means being further connected for reading out also that portion of the command signal which appears at said affirmed output of said fourth OR/OR NOT-circuit.

13. The combination defined in claim 12, further comprising a plurality of amplifiers each being interposed between a respective signal generator and the circuit element to which the output of the particular signal generator is applied.

14. The combination defined in claim 11 wherein each of said signal generators is a photoelement for scanning the respective track.

15. The combination defined in claim 12 wherein the components pertaining to tracks 0, 1, 2 and 3 constitute a first component group, and wherein there are a plurality of similar groups, the components pertaining to track 4 being part of the second group.

References Cited by the Examiner

UNITED STATES PATENTS

| | | | |
|---|---|---|---|
| 3,003,142 | 10/1961 | Wolinsky | 340—347 |
| 3,054,996 | 9/1962 | Spaulding et al. | 340—347 |
| 3,056,956 | 10/1962 | Retzinger, | 340—347 |
| 3,070,787 | 12/1962 | Waldron et al. | 340—347 |
| 3,095,559 | 6/1963 | Wolinsky | 340—347 |
| 3,143,730 | 8/1964 | McIntyre | 340—347 |

MALCOLM A. MORRISON, *Primary Examiner.*

K. R. STEVENS, *Assistant Examiner.*